United States Patent
Kim (10) Patent No.: US 8,539,258 B2
(45) Date of Patent: Sep. 17, 2013

(54) MOBILE ELECTRONIC DEVICE HAVING CONTENT TRANSMISSION INTERFACE

(75) Inventor: Chong-Sok Kim, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 548 days.

(21) Appl. No.: 12/662,570

(22) Filed: Apr. 23, 2010

(65) Prior Publication Data
US 2010/0271556 A1 Oct. 28, 2010

(30) Foreign Application Priority Data
Apr. 24, 2009 (KR) .................. 10-2009-0036068

(51) Int. Cl.
*G06F 1/32* (2006.01)
*G06F 1/26* (2006.01)

(52) U.S. Cl.
USPC ........... 713/300; 713/310; 713/320; 713/323; 713/324; 710/8; 710/13; 710/20; 710/21

(58) Field of Classification Search
None
See application file for complete search history.

(56) References Cited

U.S. PATENT DOCUMENTS

| | | | |
|---|---|---|---|
| 2002/0080091 A1* | 6/2002 | Acharya et al. | 345/2.1 |
| 2005/0149651 A1* | 7/2005 | Doak et al. | 710/52 |
| 2006/0109240 A1* | 5/2006 | Fu et al. | 345/156 |
| 2008/0165291 A1 | 7/2008 | Choi | |
| 2008/0174595 A1* | 7/2008 | Jatou et al. | 345/418 |
| 2009/0231485 A1* | 9/2009 | Steinke | 348/425.1 |

FOREIGN PATENT DOCUMENTS

| | | |
|---|---|---|
| JP | 2006-080816 | 3/2006 |
| KR | 10-2005-0080604 A | 8/2005 |
| KR | 10-2008-0064568 A | 7/2008 |

* cited by examiner

*Primary Examiner* — Fahmida Rahman
(74) *Attorney, Agent, or Firm* — Harness, Dickey & Pierce, P.L.C.

(57) ABSTRACT

The mobile electronic device for reproducing digital content includes a body and a content transmission interface connector. The body is configured to store and process the digital content, where the digital content includes high-quality uncompressed video data. The content transmission interface connector includes a male connector configured to be connected directly to an external display device and configured to output the digital content to the external display device.

6 Claims, 6 Drawing Sheets

MOBILE ELECTRONIC DEVICE HAVING CONTENT TRANSMISSION INTERFACE

CROSS-REFERENCE TO RELATED APPLICATION(S)

This application claims the benefit of Korean Patent Application No. 10-2009-0036068, filed on Apr. 24, 2009, in the Korean Intellectual Property Office, the disclosure of which is incorporated herein in its entirety by reference.

BACKGROUND

1. Field

Example embodiments of inventive concepts relate to mobile electronic devices, for example, to a mobile electronic device having a content transmission interface that may be connected directly to an external display device.

2. Description of the Related Art

As digital multimedia content has come into widespread use, various types of mobile electronic devices, e.g., mobile phones, portable multimedia players (PMPs), MP3 players, and digital cameras, which are capable of reproducing digital multimedia content have become widely spread. However, such mobile electronic devices include relatively small-sized displays, which may inconvenience users watching content on such mobile electronic devices. Accordingly, various content transmission interface methods have been introduced in order to connect a mobile electronic device to an external display device, e.g., a monitor or a television (TV), so that a user can watch content on a relatively larger display device indoors. The HDMI (High-Definition Multimedia Interface) is a representative content transmission interface method. The HDMI is advantageous in that high-quality uncompressed data can be displayed securely on a display device based on the HDCP (High-bandwidth Digital Content Protection). However, the HDMI requires an HDMI cable in order to connect two devices to each other, thereby increasing installation costs and causing inconvenience to a user.

SUMMARY

Example embodiments of inventive concepts provide a mobile electronic device having a content transmission interface that can be connected directly to an external display device without having to use a cable.

Example embodiments of inventive concepts also provides a mobile electronic device having a content transmission interface for displaying content supplied from an external source device on an external display device while saving power consumption.

According to example embodiments of inventive concepts, a mobile electronic device for reproducing digital content includes a body and a content transmission interface connector. The body is configured to store and process the digital content, where the digital content includes high-quality uncompressed video data. The content transmission interface connector includes a male connector configured to be connected directly to an external display device and configured to output the digital content to the external display device.

In example embodiments of inventive concepts, the content transmission interface connector is at least one of a high-definition multimedia interface (HDMI) connector, a D-sub connector, and a digital visual interface (DVI) connector, and the male connector of the content transmission interface connector is inserted directly into a corresponding port of the external display device.

In example embodiments of inventive concepts, the body includes a memory device configured to store the digital content, a processor configured to process the digital content, where processing of the digital content includes decoding and reproducing of the digital content, and a power controller configured to control supply of power to the memory device and the processor.

In example embodiments of inventive concepts, the mobile electronic device further includes a universal serial bus (USB) connector including a male connector configured to be connected to an external source device, wherein the mobile electronic device is configured to transmit data of the external source device to the external display device.

In example embodiments of inventive concepts, the power controller is configured to supply power to the memory device and configured to not supply power to the processor, when the USB connector is connected to the external source device, and the power controller is configured to supply power to both to the memory device and the processor when the content transmission interface connector is only connected to the external display device.

According to example embodiments of inventive concepts, a mobile electronic device for reproducing digital content includes a memory device, a processor, a content transmission interface connector and a central processing unit (CPU). The memory device is configured to store digital content. The processor is configured to process the digital content, where the processing of the digital content includes decoding and reproducing of the digital content. The content transmission interface connector including a male connector is configured to be connected directly to an external display device to output the digital content decoded by the processor. The central processing unit (CPU) is configured to control an overall operation of the mobile electronic device.

In example embodiments of inventive concepts, the mobile electronic device further includes a random access memory (RAM), a user interface unit configured to provide an interface between the mobile electronic device and a user, and a display unit for displaying the digital content.

According to example embodiments of inventive concepts, a mobile electronic device for reproducing digital content includes a body and a content transmission interface connector. The body is configured to store and process digital content, where the digital content includes high-quality uncompressed video data. The content transmission interface connector is configured to detachably connect to an external display device and is configured to output the digital content to the external display device without a cable, wherein the content transmission interface connector is at least one of a high-definition multimedia interface (HDMI) connector, a D-sub connector, and a digital visual interface (DVI) connector.

BRIEF DESCRIPTION OF THE DRAWINGS

Example embodiments of inventive concepts will be more clearly understood from the following detailed description taken in conjunction with the accompanying drawings in which.

DETAILED DESCRIPTION

Example embodiments of inventive concepts may be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1A:
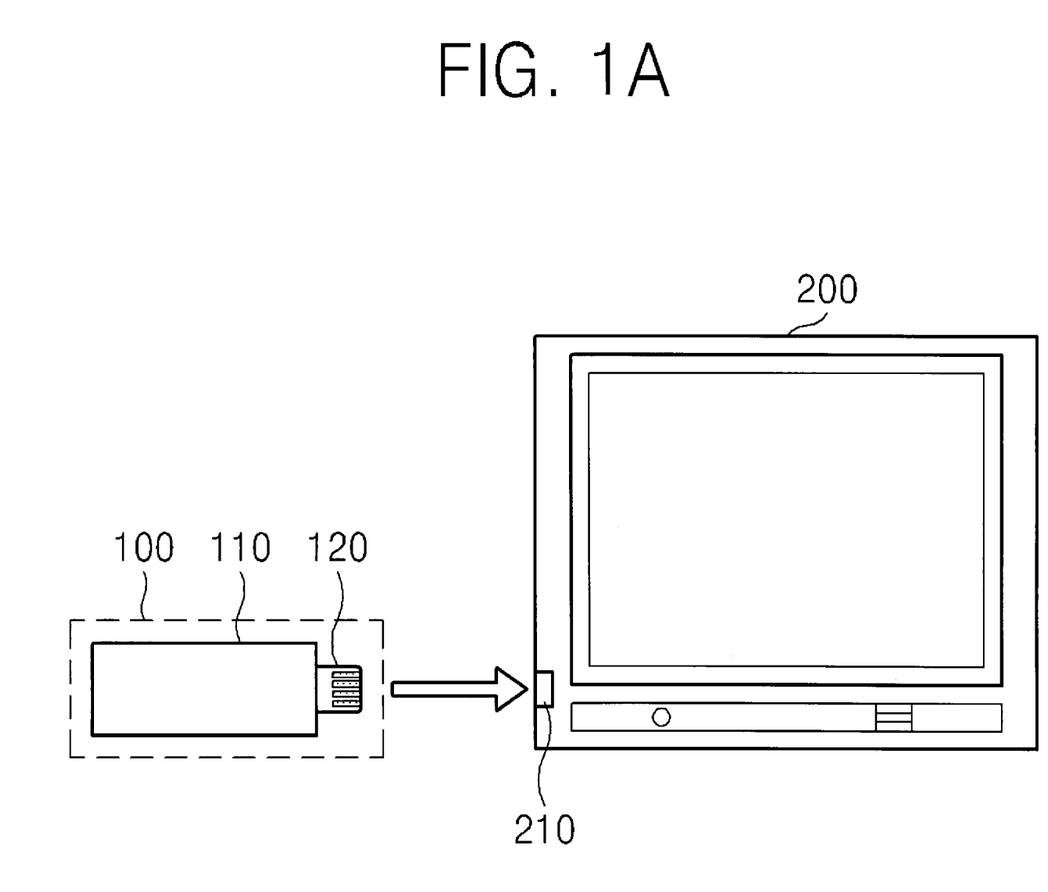
FIG. 1A illustrates a manner in which a mobile electronic device having a content transmission interface is connected to a display device, according to example embodiments of inventive concepts.
Figure 1B:
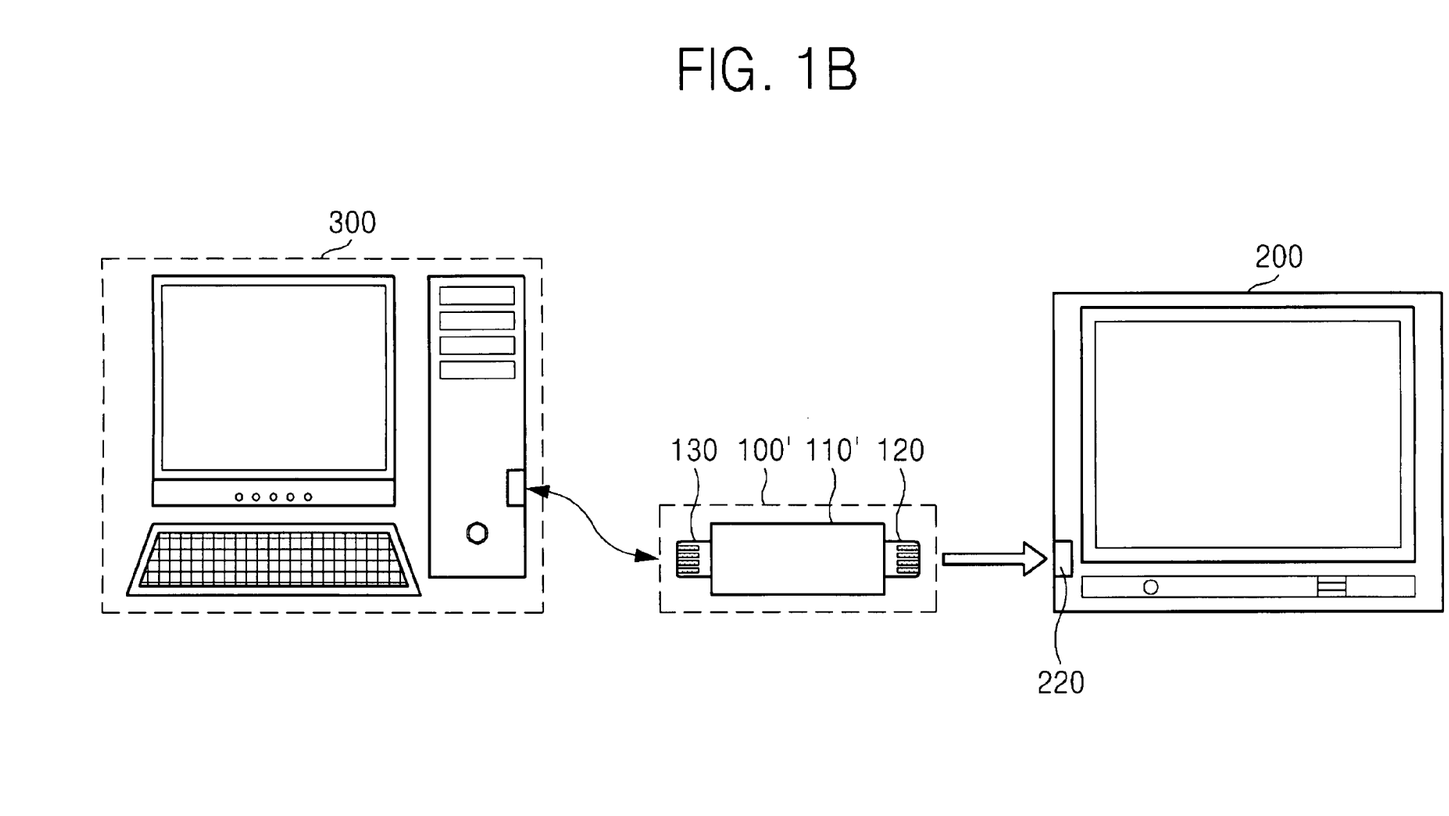
FIG. 1B illustrates another manner in which a mobile electronic device having a content transmission interface is connected to a display device, according to example embodiments of inventive concepts.

FIG. 1A illustrates a manner in which a mobile electronic device 100 having a content transmission interface is connected to a display device 200 according to example embodiments of inventive concepts. FIG. 1B illustrates another manner in which a mobile electronic device 100' having a content transmission interface is connected to a display device 200 according to example embodiments of inventive concepts.

Referring to FIG. 1A, the mobile electronic device 100 and the display device 200 may be connected directly to each other without an HDMI (High-Definition Multimedia Interface) cable. The mobile electronic device 100 includes a body 110 and an HDMI connector 120. The HDMI connector 120 is a male connector. If the HDMI connector 120 that is a male connector is inserted directly into an HDMI port 210 that is a female port of the display device 200, then the mobile electronic device 100 and the display device 200 are connected to each other. The HDMI connector 120 may be installed inside the body 110 in such a manner that the HDMI connector 120 may slide out of the body 110 or may be firmly attached to one end of the body 110.

Referring to FIG. 1B, the mobile electronic device 100' may include not only an HDMI connector 120 which is a male connector but also a universal serial bus (USB) connector 130 which is also a male connector. For example, the USB connector 130 and the HDMI connector 120 are respectively disposed at both ends of a body 110' to be opposite to each other. Thus, the display device 200 may be connected to an external source device 300 having a USB interface, e.g., a computer, via the USB connector 130 and the HDMI connector 120 in order to receive content from the external source device 300. The USB connector 130 may be installed inside the body 110' in such a manner that the USB connector 130 may slide out of the body 110' or may be firmly attached to one end of the body 110'. The USB connector 130 may be connected directly to the external source device 300 or may be connected to the external source device 300 via a USB cable (not shown).

Although FIG. 1B illustrates that the HDMI connector 120 and the USB connector 130 are disposed at both ends of the body 110', respectively, example embodiments of inventive concepts are not limited thereto and the locations of the HDMI connector 120 and the USB connector 130 may vary according to the type or structure of the mobile electronic device 100' or according to convenience of a user.

The mobile electronic device 100 or 100' may be a device that can store and reproduce digital content, e.g., a mobile phone, a portable multimedia player (PMP), an MP3 player, a digital camera, or a personal digital assistant (PDA). Other various elements may further be included in the mobile electronic device 100 or 100' according to the type of the mobile electronic device 100 or 100'. For example, if the mobile electronic device 100 or 100' is a mobile phone, then the mobile electronic device 100 or 100' may further include an antenna, a transmitting/receiving processing unit, a controller, an input unit, a display unit, and a universal subscriber identity module (USIM) card. Alternatively, if the mobile electronic device 100 or 100' is a digital camera, then the mobile electronic device 100 or 100' may further include a camera module, a lens, and a flash. However, example embodiments of inventive concepts are not limited by the above description and the mobile electronic device 100 or 100' may be embodied as various devices and other various elements may further be included therein.

Figure 2A:
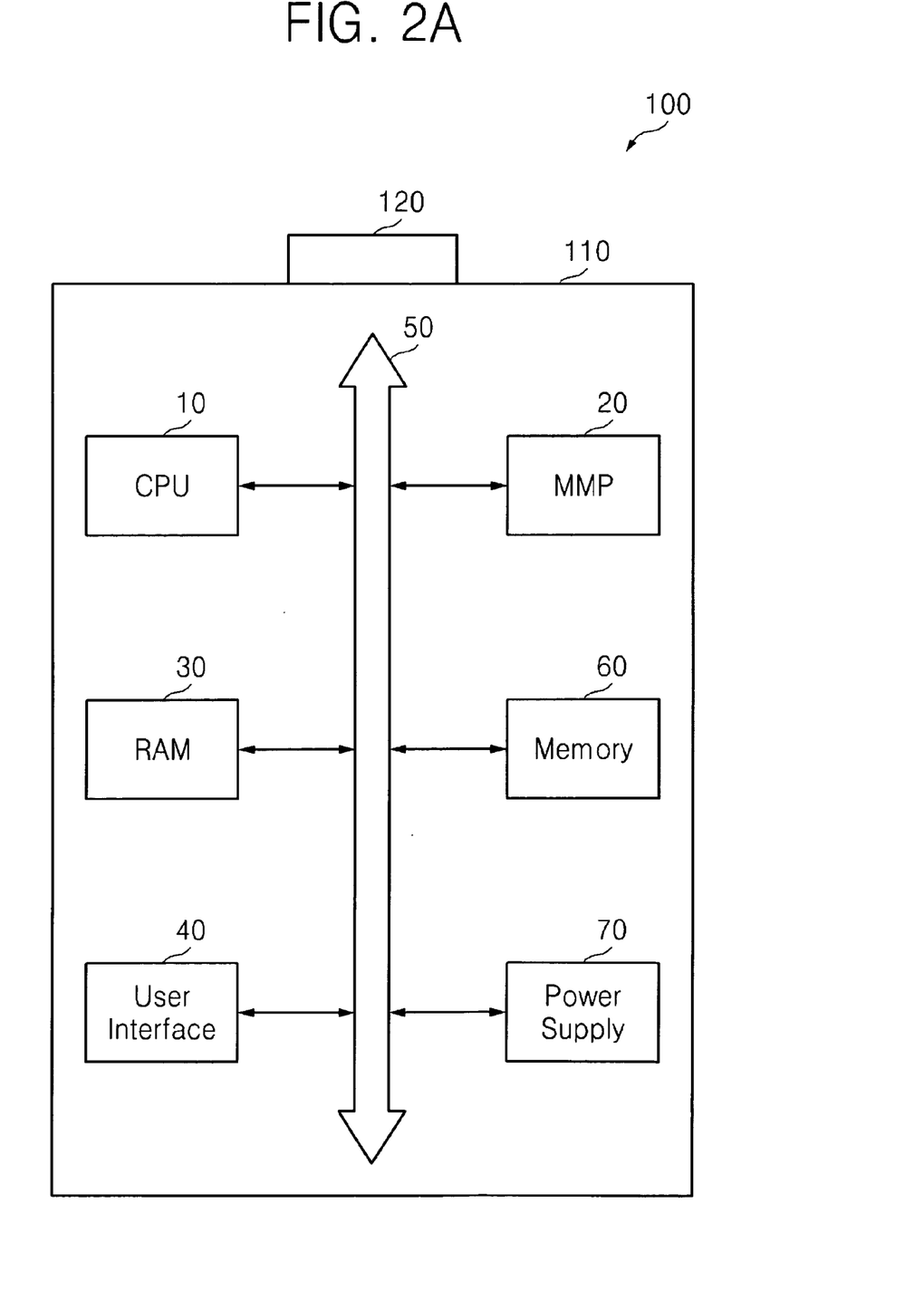
FIG. 2A is a block diagram schematically illustrating an internal structure of a mobile electronic device having a content transmission interface, according to example embodiments of inventive concepts.

FIG. 2A is a block diagram schematically illustrating an internal structure of a mobile electronic device 100 according to an example embodiments of inventive concepts. Referring to FIG. 2A, the mobile electronic device 100 includes an HDMI connector 120, a central processing unit (CPU) 10, a multi-media processor (MMP) 20, a random access memory (RAM) 30, a user interface 40, a memory device 60, a power supply unit 70, and a system bus 50 via which these elements are connected electrically to one another.

The CPU 10 controls an overall operation of the mobile electronic device 100. The RAM 30 stores information needed to operate the mobile electronic device 100, e.g., operating system (OS) information, an application program, and cache data.

The memory device 60 stores data that includes digital content, such as audio/video content. The memory device 60 may be a flash memory device but is not limited thereto. Although not shown in the drawings, the memory device 60 may include a memory unit and a memory controller that controls data to be written to or to be read from the memory unit.

For example, the MMP 20 unzips, decodes, and reproduces the digital content.

The user interface 40 provides an interface between the mobile electronic device 100 and a user. The power supply unit 70 supplies power to the internal constitutional elements of the mobile electronic device 100, e.g., the CPU 10, the MMP 20, the RAM 30, the user interface 40, and the memory device 60. The power supply unit 70 may receive power from a battery (not shown) and supply the power to the internal constitutional elements.

The HDMI connector 120 may be a male connector and may be connected directly to the HDMI port 210 of the external display device 200 of FIG. 1A.

The mobile electronic device 100 may further include other devices, such as a display unit (not shown). Also, as described above, various other elements may further be included in the mobile electronic device 100 according to the type of the mobile electronic device 100.

Figure 2B:
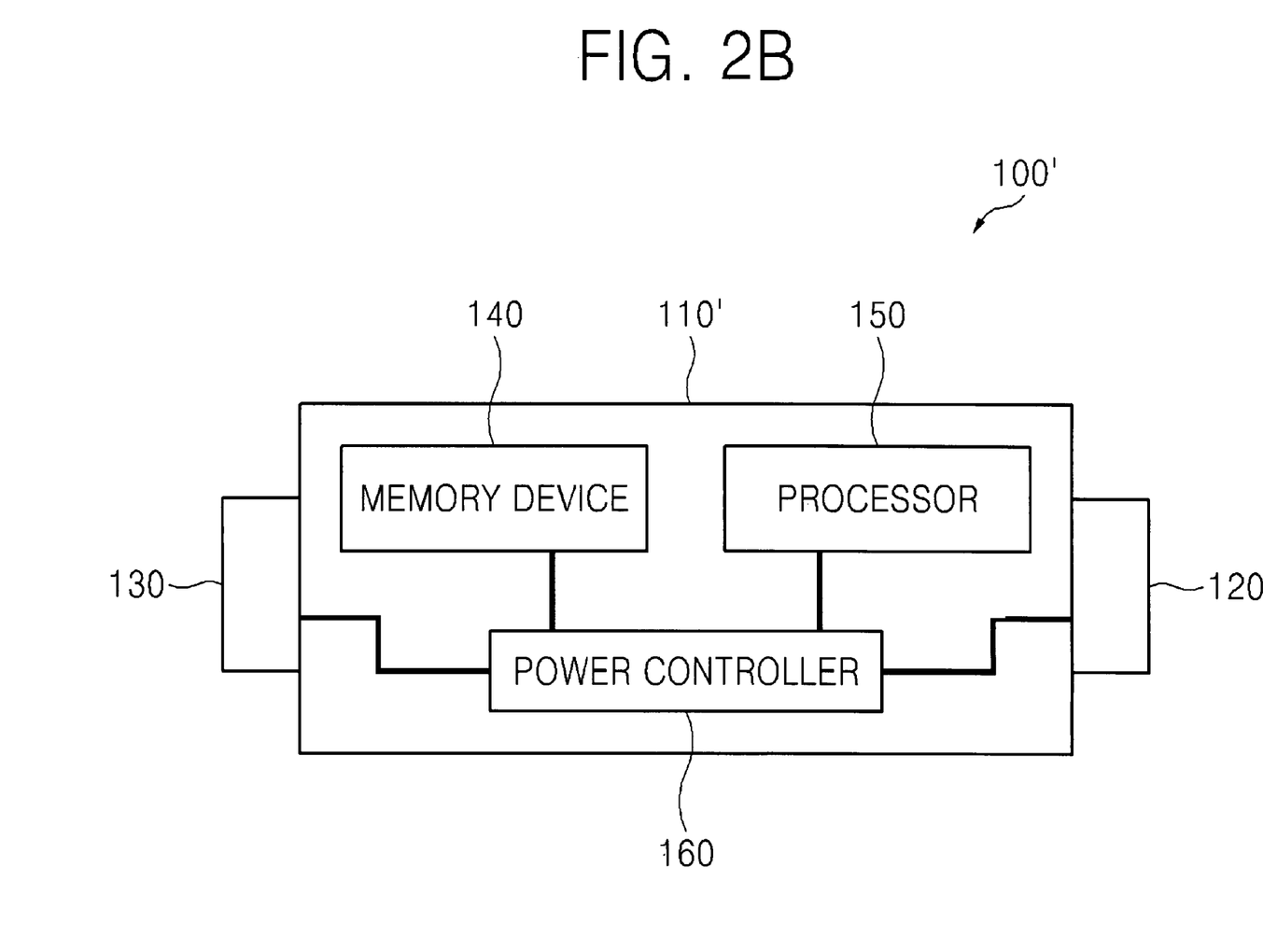
FIG. 2B is another block diagram schematically illustrating an internal structure of a mobile electronic device having a content transmission interface, according to example embodiments of inventive concepts.

FIG. 2B is another block diagram schematically illustrating an internal structure of a mobile electronic device 100' according to example embodiments of inventive concepts. The mobile electronic device 100' may be a multimedia drive. For example, the mobile electronic device 100' may not only act as a data storage device, such as a USB memory, but also reproduce and display content stored therein on an external display device (not shown).

To this end, the mobile electronic device 100' may include an HDMI connector 120, a USB connector 130, a memory device 140, a processor 150, and a power controller 160.

Similar to the memory device 60 illustrated in FIG. 2A, the memory device 140 may store data that includes digital content, such as audio/video content. As described above, the memory device 140 may be a flash memory device but is not limited thereto.

The HDMI connector 120 may be a male connector and may be connected directly to the HDMI port 220 of the external display device 200 of FIG. 1B. The USB connector 130 may also be a male connector and may be connected to the external source device 300 of FIG. 1B.

The processor 150 unzips, decodes, and reproduces the digital content. The processor 150 may be the multi-media processor (MMP).

The power controller 160 controls supply of power to the memory device 140 and the processor 150. If the USB connector 130 is connected to an external source device, e.g., a computer, then the power controller 160 supplies power only to the memory device 140 and does not supply power to the processor 150. If the HDMI connector 120 is connected to an external display device, e.g., a plasma display panel (PDP) television, then the power controller 160 supplies power to both the memory device 140 and the processor 150.

The power controller 160 may, for example, receive power via a power line, e.g., a 5V power line, of the HDMI connector 120 or the USB connector 130 and supply the power to the memory device 140 and the processor 150.

Figure 3:
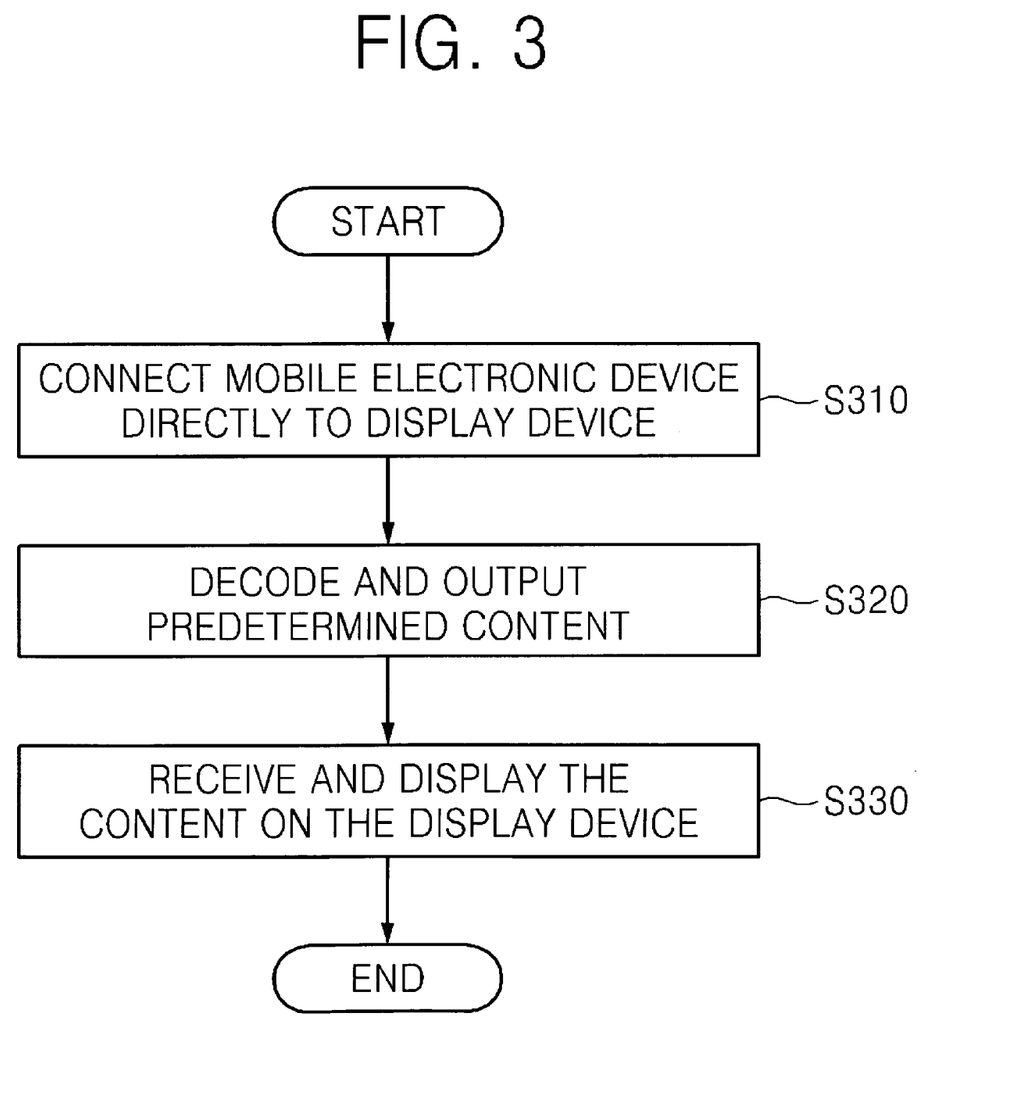
FIG. 3 is a flowchart illustrating a method of operating the mobile electronic device of FIG. 2A, according to example embodiments of inventive concepts.
Figure 4:
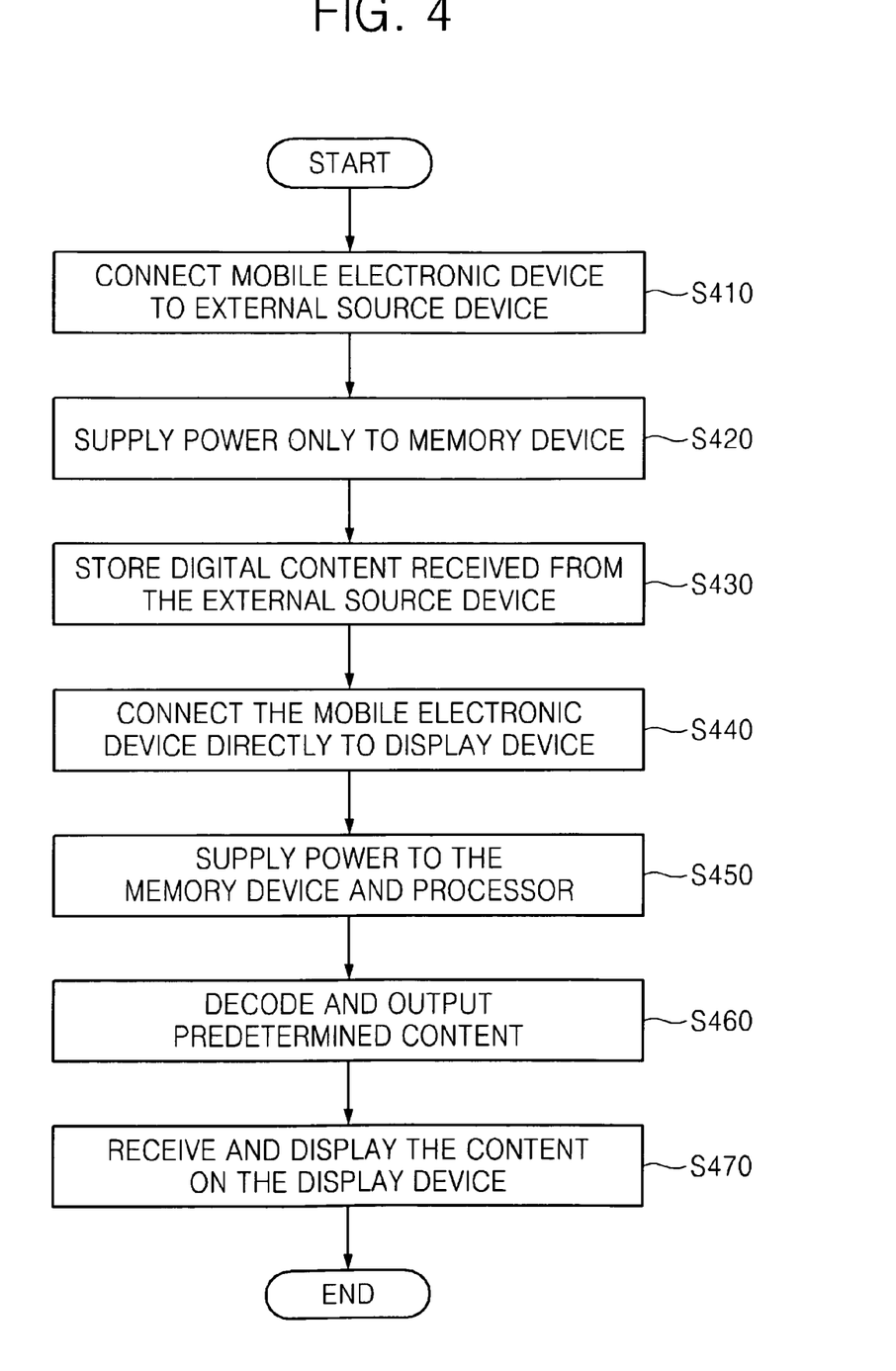
FIG. 4 is a flowchart illustrating a method of operating the mobile electronic device of FIG. 2B, according to example embodiments of inventive concepts.

FIG. 3 is a flowchart illustrating a method of operating the mobile electronic device 100 of FIG. 2A, according to example embodiments of inventive concepts. FIG. 4 is a flowchart illustrating a method of operating the mobile electronic device 100' of FIG. 2B, according to example embodiments of inventive concepts.

Referring to FIGS. 1A, 2A, and 3, if the mobile electronic device 100 is connected directly to the display device 200 via the HDMI connector 120 at step S310, then the MMP 20 decodes and outputs predetermined content from among content stored in the memory device 60 at step S320. Next, the display device 200 receives and displays the output content at step S330.

Referring to FIGS. 1B, 2B, and 4, if the mobile electronic device 100' is connected to the external source device 300 via the USB connector 130 at step S410, then the power controller 160 supplies power only to the memory device 140 and does not supply power to the processor 150 at step S420. Next, the memory device 140 receives digital content from the external source device 300 via the USB connector 130 and then stores the digital content at step S430.

Next, if the mobile electronic device 100' is connected to the display device 200 via the HDMI connector 120 at step S440, then the power controller 160 supplies power to both the memory device 140 and the processor 150 at step S450. Next, the processor 150 decodes and output predetermined content from among the content stored in the memory device 140 at step S460.

Thereafter, the display device 200 receives the content from the processor 150 and displays the content at step S470.

Example embodiments of inventive concepts are not limited by the HDMI standards. For example, the mobile electronic device 100 or 100' may include a D-sub connector or a digital visual interface (DVI) connector that is a male connector to be connected directly to an external display device according to the type or characteristics of the mobile electronic device 100 or 100'.

Example embodiments of inventive concepts may be embodied in hardware, software, firmware or combination thereof.

While inventive concepts have been particularly shown and described with reference to example embodiments thereof, it will be understood that various changes in form and details may be made therein without departing from the spirit and scope of the following claims.

What is claimed is:
1. A mobile electronic device for reproducing digital content, the mobile electronic device comprising:
  a body configured to store and process the digital content, the digital content including high-quality uncompressed video data, and the body including,
    a memory device,
    a processor, and a power controller configured to selectively control supply of power to the memory device and the processor;
a content transmission interface connector including a first male connector configured to be connected directly to an external display device and configured to output the digital content to the external display device; and
a universal serial bus (USB) connector including a second male connector configured to be connected to an external source device, wherein,
the mobile electronic device is configured to transmit data of the external source device to the external display device,
the content transmission interface connector is at least one of a high-definition multimedia interface (HDMI) connector, a D-sub connector, and a digital visual interface (DVI) connector,
the first male connector is configured to be inserted directly into a corresponding port of the external display device,
the memory device is configured to store the digital content,
the processor is configured to process the digital content, where processing of the digital content includes decoding and reproducing of the digital content, and
the power controller is configured to supply power to the memory device and configured to not supply power to the processor if the USB connector is connected to the external source device, and the power controller is configured to supply power to both to the memory device and the processor if the mobile electronic device is connected to only the external display device.

2. The mobile electronic device of claim 1, wherein the content transmission interface connector is the high-definition multimedia interface (HDMI) connector.

3. A mobile electronic device for reproducing digital content, the mobile electronic device comprising:
a memory device configured to store the digital content;
a processor configured to process the digital content, the processing of the digital content including decoding and reproducing of the digital content;
a content transmission interface connector including a first male connector configured to be connected directly to an external display device to output the digital content decoded by the processor;
a power controller configured to selectively control supply of power to the memory device and the processor;
a central processing unit (CPU) configured to control an overall operation of the mobile electronic device; and
a universal serial bus (USB) connector including a second male connector configured to be connected to an external source device to receive the digital content, wherein
the mobile electronic device is configured to transmit data of the external source device to the external display device,
the power controller is configured to supply power to the memory device and configured to not supply power to the processor if the USB connector is connected to the external source device, and the power controller is configured to supply power to both to the memory device and the processor if the mobile electronic device is connected to only the external display device.

4. The mobile electronic device of claim 3, further comprising:
a random access memory (RAM);
a user interface unit configured to provide an interface between the mobile electronic device and a user; and
a display unit for displaying the digital content.

5. The mobile electronic device of claim 3, wherein,
the content transmission interface connector is at least one of a high-definition multimedia interface (HDMI) connector, a D-sub connector, and a digital visual interface (DVI) connector, and
the first male connector is configured to be inserted directly into a corresponding port of the external display device.

6. A mobile electronic device for reproducing digital content, the mobile electronic device comprising:
a body configured to store and process the digital content, the digital content including high-quality uncompressed video data, and the body including,
a memory device,
a processor, and
a power controller configured to selectively control supply of power to the memory device and the processor;
a content transmission interface connector configured to detachably connect to an external display device and configured to output the digital content to the external display device without a cable, the content transmission interface connector being at least one of a high-definition multimedia interface (HDMI) connector, a D-sub connector, and a digital visual interface (DVI) connector; and
a universal serial bus (USB) connector including a first male connector configured to be connected to an external source device, wherein,
the mobile electronic device is configured to transmit data of the external source device to the external display device,
the content transmission interface connector includes a second male connector configured to be inserted directly into a corresponding port of the external display device,
the memory device is configured to store the digital content,
the processor is configured to process the digital content, processing of the digital content including decoding and reproducing of the digital content, and
the power controller is configured to supply power to the memory device and configured to not supply power to the processor if the USB connector is connected to the external source device, and the power controller is configured to supply power to both to the memory device and the processor if the mobile electronic device is only connected to the external display device.

* * * * *